Dec. 24, 1968     T. I. ANDREWS     3,417,785
PIPE SUPPORT
Filed Oct. 14, 1965
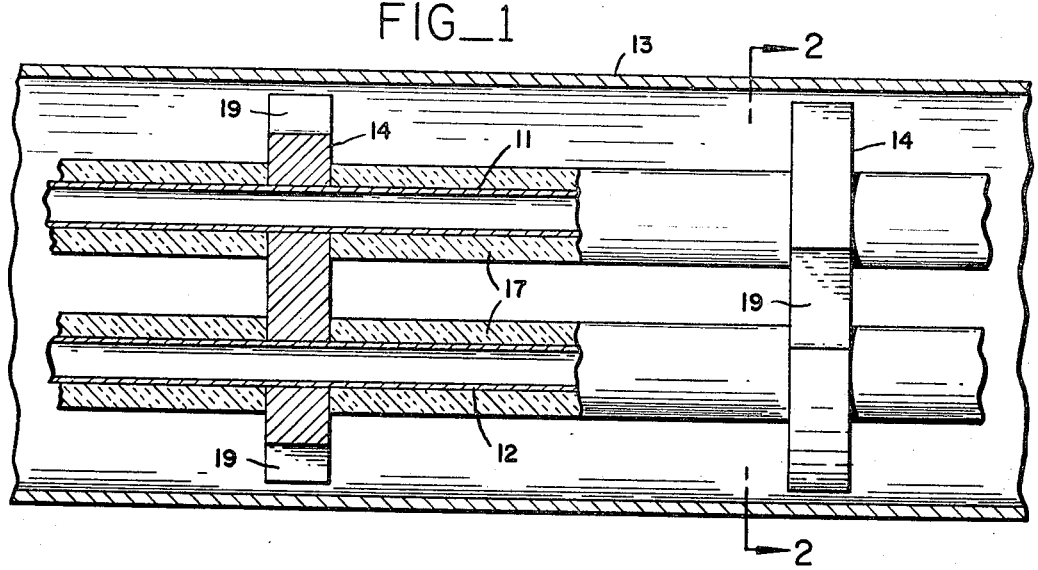
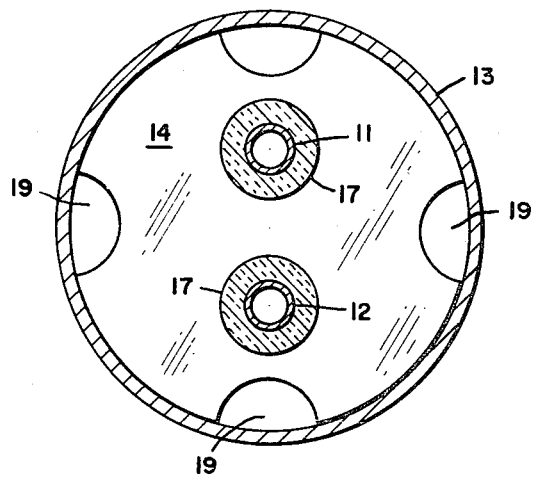
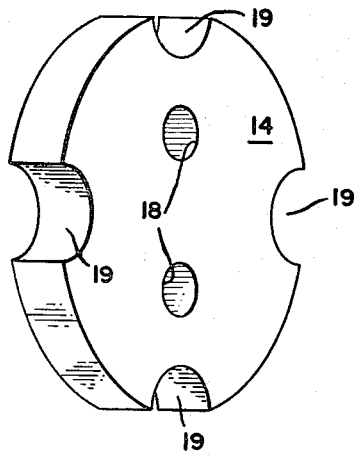
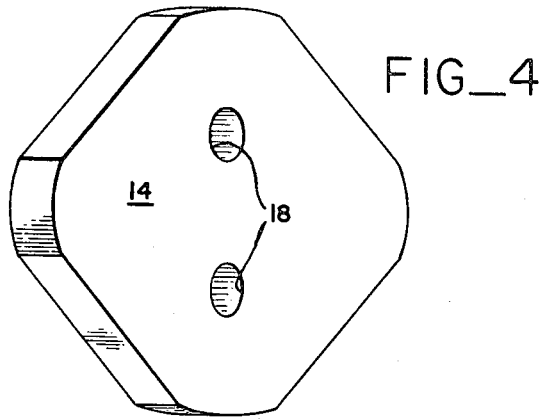
INVENTOR.
THOMAS I. ANDREWS
BY
ATTORNEYS United States Patent Office 3,417,785
Patented Dec. 24, 1968

3,417,785
PIPE SUPPORT
Thomas I. Andrews, Los Altos Hills, Calif., assignor to Seefore Corporation, San Jose, Calif., a corporation of California
Filed Oct. 14, 1965, Ser. No. 496,081
3 Claims. (Cl. 138—108)

ABSTRACT OF THE DISCLOSURE

A pipe support for maintaining pipes in a casing in spaced relationship comprising a homogeneous mixture of polyester and limestone having apertures for slidably receiving pipes.

This invention relates to a pipe support and more particularly to a support for supporting carrier pipe within a casing.

In pipe systems, such as steam systems, of the type in which one or more carrier pipes are enclosed within a casing, the pipes are supported longitudinally within and in spaced relationship with respect to the casing whereby to minimize heat losses from the carrier pipes, which may be insulated, to the casing and surrounds. Preferably, the carrier pipes are electrically insulated from the casing whereby ground currents and the like do not find their way into the carrier pipes causing damage thereto or where high voltages may be encountered resulting in injury to personnel.

Generally, in the prior art, the carrier pipes are supported by apertured members which receive and support the carrier pipes. The outside of the supports contacts the casing to support the pipes in longitudinal spaced relationship therewith. Supports of the prior art have included reinforced concrete supports and metal supports. Concrete supports are relatively heavy, and the reinforcement is electrically conductive. Further, the porous concrete absorbs moisture thereby further reducing the electrical insulating properties. Because of thermal expansion and contraction and the character of the supports of the prior art, they have abraded the carrier pipes.

It is a general object of the invention to provide an improved pipe support.

It is another object of the invention to provide an inexpensive, easy to manufacture pipe support.

It is still a further object of the invention to provide an insulating non-wettable pipe support.

It is still another object of the present invention to provide a pipe support which has relatively high strength.

The foregoing and other objects of the invention will become more clearly apparent from the following description when taken in conjunction with the accompanying drawing.

Referring to the drawing:

FIGURE 1 is a side elevational view of a pipe assembly, partly in section, illustrating the insulated carrier pipes and the supports;

FIGURE 2 is a sectional view taken along the line 2—2 of FIGURE 1;

FIGURE 3 is a perspective view of a pipe support in accordance with the invention; and FIGURE 4 is a perspective view of another pipe support in accordance with the invention.

A pair of insulated carrier pipes 11 and 12 are shown supported within a casing 13 by means of longitudinally spaced supports 14. The carrier pipes 11 and 12 are provided with an insulating jacket 17 which may be of conventional insulating material such as fiber glass, calcium silicate, asbestos, expanded plastic, magnesia, etc. The jackets 17 extend to and abut against the faces of the supports 14. The pipes 11 and 12 extend through apertures 18 formed in the support. In assembling a pipe, the supports are threaded onto the pipes and located; then the insulating jackets 17 are applied.

The support may be of circular or other configuration with the outer edges bearing against the casing to support the pipes therefrom.

The support may be of circular or other configura-shaped having cut-out portions 19 which form longitudinal passages for flow of water or moisture within the casing, or for venting. The longitudinal spacing of the pipe supports is selected to support the pipes and prevent the same from sagging under their weight whereby they are maintained in spaced relationship with respect to the casing.

The foregoing describes a conventional type construction and arrangement of a pipe assembly wherein insulated carrier pipes are enclosed within a casing and supported by longitudinally spaced supports.

In accordance with the present invention, there is provided an improved pipe support. The improved pipe support is selected to have low abrasion where it supports the pipe and bears against the casing, low heat and electrical conductivity; to withstand high temperatures; have high strength; and to be inexpensive.

It has been found that a suitable support may be formed of a homogeneous mixture of a high temperature plastic material such as high temperature polyester and a filler material such as limestone. In one particular example, the homogeneous composition ranged between 25 and 45 percent by weight polyester, and 55 to 75 percent by weight limestone having a mesh size ranging between 16 and 80 mesh.

Other types of high temperature binder plastic may be employed such as high temperature, high strength polymers. The filler may comprise calcium or other insulating material which does not have a high affinity for water. The high temperature plastic and the particulate insulating material are mixed and poured into molds where the mixture sets up to form the supports.

I claim:

1. A support for use in a pipe system of the type including a casing surrounding one or more carrier pipes disposed longitudinally in spaced relationship within the same comprising a flat member having spaced major surfaces and outer edges adapted to be disposed in said casing with its major surfaces substantially perpendicular to the axis of said casing and the outer edges engaging said casing, said flat member comprising a homogeneous mixture of a high temperature plastic material and an insulating filler material, at least one aperture formed in said member to extend between the major surfaces for slidably receiving said carrier pipe to support the carrier pipe from the casing.

2. A support as in claim 1 wherein said high temperature plastic comprises a polyester.

3. A support as in claim 2 wherein said filler comprises particulate limestone.

(References on following page)

References Cited

UNITED STATES PATENTS

| | | | |
|---|---|---|---|
| 240,236 | 4/1881 | Delany | 138—108 X |
| 247,432 | 9/1881 | Strohm | 138—113 |
| 266,916 | 10/1882 | Strohm | 138—112 |
| 315,954 | 4/1885 | Lytle | 138—108 |
| 1,805,990 | 5/1931 | Makowski | 138—106 X |
| 1,818,922 | 8/1931 | Parker | 138—112 |
| 1,856,109 | 5/1932 | Murray | 138—113 X |
| 2,664,112 | 12/1953 | Isenberg | 138—113 |
| 3,100,529 | 8/1963 | McStravick et al. | 135—112 X |
| 3,113,595 | 12/1963 | Cotman | 138—113 |
| 3,250,297 | 5/1966 | Mooneyham | 138—113 |

HOUSTON S. BELL, JR., *Primary Examiner.*

U.S. Cl. X.R.

138—112